United States Patent [19]

Horiguchi et al.

[11] 4,389,667
[45] Jun. 21, 1983

[54] FLYING SPOT SCANNER FOR USE IN A COLOR PRINTING PROCESS SIMULATING APPARATUS

[75] Inventors: Satoru Horiguchi, Iruma; Takeshi Sasaoka, Kawasaki City, both of Japan

[73] Assignees: Dai Nippon Printing Co. Ltd.; Ikegami Tsushinki Co. Ltd., both of Tokyo, Japan

[21] Appl. No.: 240,068

[22] Filed: Mar. 3, 1981

[30] Foreign Application Priority Data

Mar. 10, 1980 [JP] Japan .................. 55-29893

[51] Int. Cl.³ .................. H04N 1/10; H04N 5/84
[52] U.S. Cl. .................. 358/75; 358/80; 358/293
[58] Field of Search ............. 358/75, 80, 285, 293

[56] References Cited

U.S. PATENT DOCUMENTS

| | | | |
|---|---|---|---|
| 2,790,844 | 4/1957 | Neugebauer | 358/80 |
| 2,885,463 | 5/1959 | Rydz | 358/80 |
| 3,100,815 | 8/1963 | Drake | 358/80 |
| 3,621,126 | 11/1971 | Taudt | 358/75 |
| 3,627,908 | 12/1971 | Dailey | 358/80 |
| 3,800,071 | 3/1974 | Reeber | 358/80 |

Primary Examiner—Tommy P. Chin
Attorney, Agent, or Firm—Spencer & Kaye

[57] ABSTRACT

A flying spot scanner for use in a color printing process simulating apparatus for scanning yellow, magenta, cyan and black separation films formed from a color original a color image of which is to be displayed on a color monitor. The flying spot scanner comprises a flat stage having rectangular transparent sections arranged side by side with their long sides adjacent to each other for receiving the color separation films; first and second cathode ray tubes for producing first and second scanning rasters, respectively arranged above the middle point of the first and second films and the middle point of the third and fourth films, respectively; first and second lens systems for projecting images of the first scanning raster produced on the first cathode ray tube onto the first and second color separation films, respectively; and third and fourth lens systems for projecting images of the second scanning raster of the second cathode ray tube onto the third and fourth color separation films, respectively. By driving the first and second flying spot tubes in synchronism with each other, the four color separation films are simultaneously scanned with rasters having very small distortional errors.

4 Claims, 10 Drawing Figures

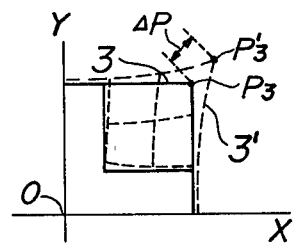
FIG_4
PRIOR ART
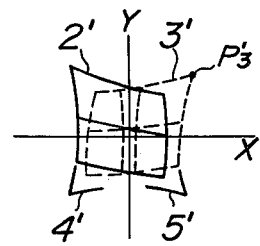
FIG_5
PRIOR ART
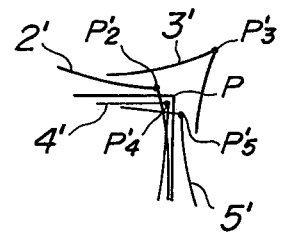
FIG_6
PRIOR ART

FLYING SPOT SCANNER FOR USE IN A COLOR PRINTING PROCESS SIMULATING APPARATUS

BACKGROUND OF THE INVENTION

The present invention relates to a flying spot scanner for scanning a set of four color separation films formed from a color original for use in an apparatus for simulating a color printing process with the aid of a color image of the color original displayed on a color monitor screen.

In such a color printing process simulating apparatus, yellow, magenta, cyan and black separation films formed from a color original are simultaneously scanned by a flying spot scanner to derive primary color signals of yellow, magenta, cyan and black and then the primary color signals are processed in a predetermined manner to produce red, green and blue color image signals. By supplying the red, green and blue color image signals to the color monitor the color image of the original is displayed on its screen.

FIGS. 1a and 1b are diagrammatic sectional and plan views, respectively showing a known flying spot scanner for use in such a simulating apparatus. The flying spot scanner comprises a film setting stage 1 including four transparent plates 1a to 1d on which four color separation films 2 to 5 are placed, a single cathode ray tube 6 producing a scanning raster on its screen, and four lens systems each for projecting an image of the scanning raster produced on the cathode ray tube screen onto respective color separation films 2 to 5. The yellow, magenta, cyan and black separation films 2 to 5 are placed on the stage 1 at four corners of a relatively large square and the cathode ray tube 6 is arranged above the stage 1 in such a manner that its optical axis 11 intersects perpendicularly a middle point C of the four films 2 to 5, i.e. a center point of said square. The lens systems 7 to 10 are arranged between the stage 1 and the cathode ray tube 6 at such positions that they intersect lines passing between a center point of the cathode ray tube screen and center points of respective films 2 to 5. In this manner the scanning raster produced on the screen of cathode ray tube 6 is projected on the color separation films 2 to 5 and these films are simultaneously scanned. Light rays passing through the respective films 2 to 5 are received by four photoelectric converters such as photomultipliers (in the drawing only two photomultipliers 12 and 13 are shown). In this manner primary color signals of yellow, magenta, cyan and black are simultaneously derived at terminals 14 to 17, respectively.

Now the optical system of the known flying spot scanner will be considered with reference to FIGS. 2 to 6. Since a principal optical axis of the lens 8 for projecting the raster onto the color separation film 3 is greatly inclined in both the X and Y directions, a corner point $P'_3$ of projected raster image 3' which point corresponds to a corner point $R_3$ of the raster on the cathode ray tube 6 shown in FIG. 3 is deflected from a corresponding corner point $P_3$ of the film 3 shown in FIG. 2 by an amount $\Delta P$. This is applied to all the raster images projected on the color separation films 2 to 5 and the following equation can be derived.

$$P'_n = P_n \pm \Delta P \ (n=1, 2, 3, 4)$$

In a usual lens the scanning raster formed on the cathode ray tube 6 is projected with pin cushion mode distortion and thus, the scanning raster image 3' projected on the color separation film 3 is distorted as shown in FIG. 4. The distortion of the raster images 2' to 5' projected on the four films 2 to 5 appear symmetrically with respect to a center point O. Therefore when these raster images 2' to 5' are superimposed with each other, they deviates from each other as illustrated in FIG. 5. It should be noted that in FIG. 5 only corner parts of the raster images 4' and 5' projected on the films 4 and 5 are shown for the sake of clarity.

FIG. 6 shows an enlarged configuration of the superimposed raster images 2' to 5' at one corner. In this manner the corner points $P'_2$ to $P'_5$ of the four projected raster images 2' to 5' do not coincide with each other and a large registration error is produced. Therefore, reproduced color at the corner portions of the color image displayed on the color monitor becomes entirely different from the color of the original and accurate simulation can not be effected.

The above mentioned distortion and registration error become larger, when the scanning is at a higher speed and density. In the color printing process simulating apparatus comprising a cathode ray tube which has 40 percent more scanning lines than the usual cathode ray tube employed in a color television receiver, it is extremely undesirable for the projected raster images to deviate from each other.

In order to obviate the above mentioned drawback it has been proposed to provide four cathode ray tubes with the four color separation films being scanned by respective cathode ray tubes. In this case the above distortion of the projected raster images and the registration error can be removed, but it is quite difficult to register the four rasters, and the scanner becomes large in size and very expensive.

Consideration has also been given to providing one or two cathode ray tubes and a plurality of half mirrors and reflection mirrors. In this arrangement, a light beam from the cathode ray tube is divided into two or four beams and the divided beams are perpendicularly projected on two or four color separation films. In such a scanner, the number of cathode ray tubes and the distortion and registration error of the raster images may be reduced. However, the intensity of the scanning beam is reduced to a great extent and the signal to noise ratio of the primary color signals is decreased to an inadmissible extent.

SUMMARY OF THE INVENTION

The present invention has for its object to provide a flying spot scanner for use in an apparatus for simulating a color printing process which avoids the drawbacks of the known scanners. Distortion of raster images projected on color separation films is materially reduced at the corner portions and the registration error is decreased to a great extent.

According to the invention a flying spot scanner for scanning a set of first, second, third and fourth color separation films formed from a color original, for use in an apparatus for simulating a color printing process with the aid of a color image of the original which is displayed on a color monitor by processing primary color signals derived by scanning the set of color separation films comprises a film setting stage having first, second, third and fourth transparent sections on which said first, second, third and fourth color separation films are placed, respectively;

a first scanning optical system arranged above the first and second transparent sections for optically scanning the first and second color separation films placed on said first and second transparent sections, respectively; and a second optical scanning system arranged above said third and fourth transparent sections for optically scanning the third and fourth color separation films placed on said third and fourth transparent sections.

In a preferred embodiment of the flying spot scanner according to the invention, said first optical scanning system comprises a first cathode ray tube for producing a first scanning raster on its screen and having an optical axis which intersects perpendicularly the film setting stage at a middle point of the first and second color separation films, and first and second lens systems arranged on lines extending from the center of the screen of the first cathode ray tube and the centers of the first and second color separation films, respectively for projecting images of the first scanning raster on the first and second color separations films, respectively; and said second optical scanning system comprises a second cathode ray tube for producing a second scanning raster on its screen and having an optical axis which intersects perpendicularly the film setting stage at a middle point of the third and fourth color separation films, and third and fourth lens systems arranged on lines extending from the center of the screen of the second cathode ray tube and the centers of the third and fourth color separation films, respectively for projecting images of the second scanning raster on the third and fourth color separation films, respectively.

In such a flying spot scanner it is further preferable to arrange the four transparent sections side by side equidistantly. Then an operator can easily handle the color separation films.

Usually the color separation films are not square, but rectangular. Therefore, by arranging the rectangular transparent sections of the stage in a row with their long sides being adjacent to each other, the angle between the light paths passing through the first and second lens systems and the angle between light paths passing through the third and fourth lens systems can be made smaller and the distortion and registration errors can be further reduced. Moreover, the whole scanner can be made smaller in size.

BRIEF DESCRIPTION OF THE DRAWINGS

FIG. 4 is a schematic view showing the distortion of a projected raster image with respect to a color separation film;

FIG. 5 is a schematic view showing the registration error of four raster images superimposed on each other;

FIG. 6 is an enlarged view of corner portions of superimposed raster images;

DESCRIPTION OF THE PREFERRED EMBODIMENTS

Figure 1A:
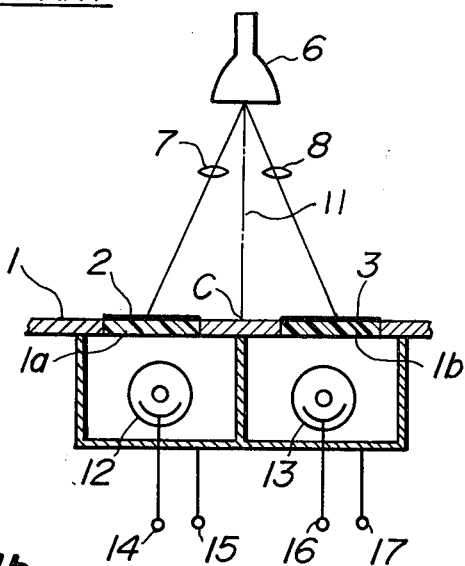
FIGS. 1a and 1b are schematic sectional and plan views, respectively showing a known flying spot scanner of a color printing process simulating apparatus.
Figure 1B:
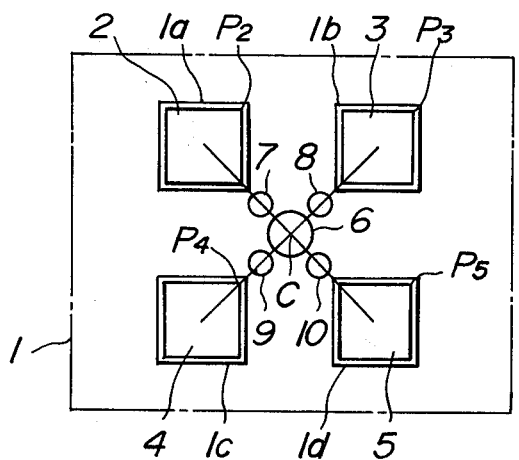
Figure 2:
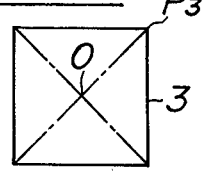
FIG. 2 is a plan view of a color separation film.
Figure 3:
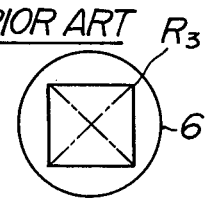
FIG. 3 is a plan view depicting the scanning raster formed on a cathode ray tube screen.
Figure 7A:
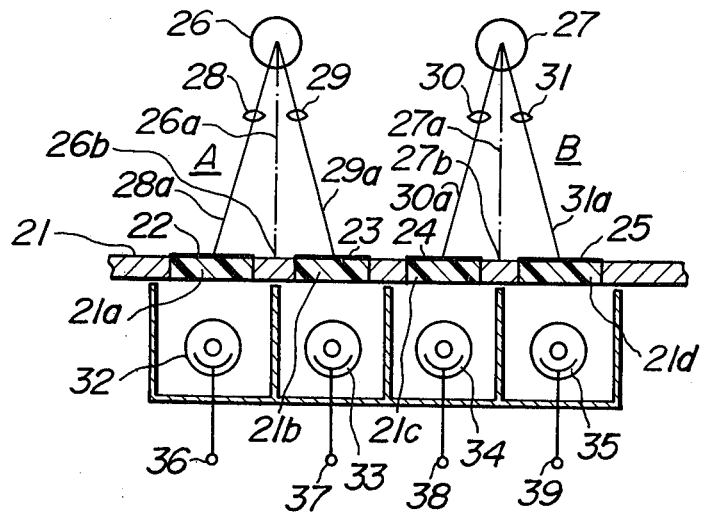
FIGS. 7a and 7b are schematic sectional and plan views illustrating an embodiment of a flying spot scanner according to the invention.
Figure 7B:
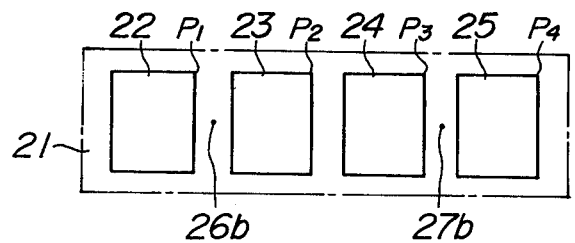

FIGS. 7a and 7b show an embodiment of a flying spot scanner for use in a color printing process simulating apparatus according to the invention. The flying spot scanner of the invention comprises first and second optical scanning systems A and B each for scanning two color separation films. As illustrated in the drawing the flying spot scanner comprises a flat stage 21 having first, second, third and fourth rectangular transparent sections 21a to 21d for setting four yellow, magenta, cyan and black color separation films 22 to 25. In this embodiment the four transparent sections 21a to 21d are arranged in row with their long sides being adjacent to each other so as to set the four color separation films as close as possible to each other. Therefore, the whole flying spot scanner can be made smaller in size and an operator can treat the films easily.

The first optical scanning system A comprises a first cathode ray tube 26, i.e. a first flying spot tube for producing a first scanning raster on its screen. The tube 26 is so arranged that its optical axis 26a intersects perpendicularly the film setting stage 21 at a middle point 26b between the adjacent first and second transparent sections 21a and 21b. The first optical scanning system A further comprises first and second lens systems 28 and 29 arranged between the first flying spot tube 26 and the first and second transparent sections 21a and 21b, respectively in such a manner that light paths 28a and 29a extending from a center of the tube 26 to centers of the transparent sections 21a and 21b, respectively pass the lens systems 28 and 29, respectively. The lens systems 28 and 29 are further so arranged that their principal planes are parallel to the film setting stage 21.

The second optical scanning system B has the same construction as that of the first scanning system A and comprises a second flying spot tube 27 having an optical axis 27a which intersects perpendicularly the stage 21 at a middle point 27b between the third and fourth transparent sections 21c and 21d, and third and fourth lens systems 30 and 31 for projecting a second raster produced on a screen of the second tube 27 onto the films 24 and 25.

By driving the first and second flying spot tube 26 and 27 in synchronism with each other, the first raster produced on the screen of the first flying spot tube 26 is projected onto the first and second color separation films 22 and 23 and the second raster on the screen of the second flying spot tube 27 is projected on the third and fourth color separation films 24 and 25 and thus, the four color separation films 22 to 25 are scanned simultaneously. Light rays passing through the films 22 to 25 are received by photomultipliers 32 to 35, respectively which produce primary color signals of yellow, magenta, cyan and black at output terminals 36 to 39, respectively.

According to the invention since each of the cathode ray tubes 26 and 27 is used only for two color separation films 22, 23 and 24, 25 and these two films can be arranged closer to each other, an angle between the optical paths 28a and 29a; 30a and 31a can be made smaller.

Figure 8:
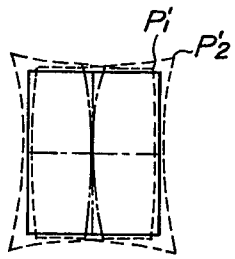
FIG. 8 is a schematic view showing the registration error of four projected raster images in the flying spot scanner of the invention.

Therefore, distortions of the two raster images projected on the color separation films 22 and 23; 24 and 25 can be materially reduced in the Y direction and there remains only a slight distortions in the X direction as illustrated in FIG. 8.

As explained above in the flying spot scanner according to the invention, by adding only one flying spot tube to the known scanner having a single flying spot tube and two paired color separation films scanned by respective tubes, the distortions of the projected raster images in the Y direction can be substantially avoided. Further since the paired color separation films can be arranged side by side closer to each other, the inclined angle between the two light paths can be made smaller and thus, the distortion of the projected raster images can be materially reduced. In this manner according to the invention the registration error of color images displayed on a color monitor screen can be reduced to a great extent even at corner portions and very precise color reproduction can be effected.

What is claimed is:

1. In combination with an apparatus for simulating a color printing process, a flying spot scanner for scanning a set of first, second, third and fourth color separation films formed from a color original, the color original being displayed on a color monitor by processing primary color signals derived by scanning said set of color separation films, said flying spot scanner comprising a film setting stage having first, second, third and fourth transparent sections on which said first, second, third and fourth color separation films are placed, respectively;

a first optical scanning system arranged above said first and second transparent sections for optically scanning said first and second color separation films placed on said first and second transparent sections, respectively, said first optical scanning system comprising a first cathode ray tube for producing a first scanning raster on its screen and having an optical axis which intersects perpendicularly the film setting stage at the midpoint of said first and second color separation films, and first and second lens systems arranged on lines extending from the center of the screen of said first cathode ray tube and the centers of said first and second color separation films, respectively, for projecting images of said first scanning raster on said first and second color separation films, respectively; and a second optical scanning system arranged above said third and fourth transparent sections for optically scanning said third and fourth color separation films placed on said third and fourth transparent sections, said second optical scanning system comprising a second cathode ray tube for producing a second scanning raster on its screen and having an optical axis which intersects perpendicularly the film setting stage at the midpoint of said third and fourth color separation films, and third and fourth lens systems arranged on lines extending from the center of the screen of said second cathode ray tube and the centers of said third and fourth color separation films, respectively, for projecting images of said second scanning raster on said third and fourth color separation films, respectively.

2. A flying spot scanner according to claim 1, wherein the principal plane of each of said four lens systems is parallel to said respective color separation films.

3. A flying spot scanner according to claim 1, wherein said transparent sections of the film setting stage are arranged side by side in a row.

4. A flying spot scanner according to claim 2, wherein said transparent sections are rectangular and arranged in a row with their long sides adjacent to each other.

* * * * *